(12) United States Patent
Lego et al.

(10) Patent No.: US 12,092,339 B2
(45) Date of Patent: Sep. 17, 2024

(54) HOUSEHOLD COOKING APPLIANCE

(71) Applicant: BSH Hausgeräte GmbH, Munich (DE)

(72) Inventors: Dieter Lego, Karlsruhe (DE); Martin Nagel, Forstheim (DE); Stefan Diederichs, Sternenfels (DE); Hanna Wolf, Satteldorf (DE)

(73) Assignee: BSH Hausgeräte GmbH, Munich (DE)

( * ) Notice: Subject to any disclaimer, the term of this patent is extended or adjusted under 35 U.S.C. 154(b) by 812 days.

(21) Appl. No.: 16/095,956

(22) PCT Filed: Aug. 1, 2017

(86) PCT No.: PCT/EP2017/069455
§ 371 (c)(1),
(2) Date: Oct. 24, 2018

(87) PCT Pub. No.: WO2018/033384
PCT Pub. Date: Feb. 22, 2018

(65) Prior Publication Data
US 2019/0137112 A1    May 9, 2019

(30) Foreign Application Priority Data
Aug. 19, 2016 (DE) .......................... 102016215650.0

(51) Int. Cl.
*A47J 27/04* (2006.01)
*F24C 15/20* (2006.01)
*F24C 15/32* (2006.01)

(52) U.S. Cl.
CPC ............. *F24C 15/327* (2013.01); *A47J 27/04* (2013.01); *F24C 15/2007* (2013.01); *F24C 15/2021* (2013.01)

(58) Field of Classification Search
CPC ................ F24C 15/327; F24C 15/2007; F24C 15/2021; A47J 27/04
(Continued)

(56) References Cited

U.S. PATENT DOCUMENTS

| 3,131,688 A | * | 5/1964 | Lipstein ............... F24C 15/2042 |
| | | | 126/299 R |
| 3,146,691 A | * | 9/1964 | Mck .......................... A23L 3/18 |
| | | | 99/330 |

(Continued)

FOREIGN PATENT DOCUMENTS

| DE | 10245773 C1 | 12/2003 |
| DE | 10330250 B3 | 12/2004 |

(Continued)

OTHER PUBLICATIONS

International Search Report PCT/EP2017/069455 dated Sep. 28, 2018.
National Search Report DE 10 2016 215 650.0 dated Jul. 20, 2017.

*Primary Examiner* — Eric S Stapleton
(74) *Attorney, Agent, or Firm* — Michael E. Tschupp; Andre Pallapies; Brandon G. Braun (57) ABSTRACT

A household cooking appliance includes a cooking chamber, a steam generator located outside the cooking chamber, and a steam feed line which connects the steam generator to the cooking chamber. A fresh air line leads to the cooking chamber, with a shut off element being configured to shut off the fresh air line. The steam feed line and the fresh air line have a common end portion, which opens into the cooking chamber.

13 Claims, 3 Drawing Sheets

(58) Field of Classification Search
USPC .......................................................... 99/331
See application file for complete search history.

(56) References Cited

U.S. PATENT DOCUMENTS

| | | | | |
|---|---|---|---|---|
| 4,162,381 A * | 7/1979 | Buck | ................ | H05B 6/645 |
| | | | | 219/705 |
| 4,167,585 A * | 9/1979 | Caridis | ................ | A21B 1/48 |
| | | | | 426/233 |
| 4,189,995 A * | 2/1980 | Lohr | ................ | F24C 15/327 |
| | | | | 126/21 A |
| 4,228,730 A * | 10/1980 | Schindler | ............ | A47J 37/1214 |
| | | | | 126/391.1 |
| 4,281,636 A * | 8/1981 | Vegh | ................ | A47J 27/16 |
| | | | | 126/20 |
| 4,316,068 A * | 2/1982 | Tanabe | ................ | F24C 7/08 |
| | | | | 219/497 |
| 4,410,030 A * | 10/1983 | Skala | ................ | A47J 27/17 |
| | | | | 165/236 |
| 4,506,598 A * | 3/1985 | Meister | ................ | F24C 15/327 |
| | | | | 126/20 |
| 4,509,412 A * | 4/1985 | Whittenburg | ............ | A47J 27/04 |
| | | | | 126/20 |
| 4,623,780 A * | 11/1986 | Shelton | ................ | A47J 39/003 |
| | | | | 126/20 |
| 4,650,968 A * | 3/1987 | Williams | ................ | A47J 27/04 |
| | | | | 126/20 |
| 4,700,685 A * | 10/1987 | Miller | ................ | A21B 3/04 |
| | | | | 126/20 |
| 4,722,321 A * | 2/1988 | Meister | ................ | A21B 3/04 |
| | | | | 126/20 |
| 4,800,806 A * | 1/1989 | Durth | ................ | A21B 3/04 |
| | | | | 219/400 |
| 4,817,509 A * | 4/1989 | Erickson | ................ | A47J 37/015 |
| | | | | 219/386 |
| 4,817,582 A * | 4/1989 | Oslin | ................ | A21B 1/24 |
| | | | | 126/20 |
| 4,851,644 A * | 7/1989 | Oslin | ................ | A47J 27/04 |
| | | | | 219/400 |
| 4,906,485 A * | 3/1990 | Kirchhoff | ................ | A21B 3/04 |
| | | | | 126/20 |
| 4,930,489 A * | 6/1990 | McFadden | ............ | F24C 3/087 |
| | | | | 126/39 E |
| 5,014,679 A * | 5/1991 | Childs | ................ | A47J 27/04 |
| | | | | 126/21 A |
| 5,080,087 A * | 1/1992 | McFadden | ............ | F24C 3/087 |
| | | | | 126/20 |
| 5,155,339 A * | 10/1992 | An | ................ | H05B 6/6458 |
| | | | | 219/492 |
| 5,256,382 A * | 10/1993 | Ford | ................ | A61L 2/06 |
| | | | | 219/401 |
| 5,272,963 A * | 12/1993 | Del Fabbro | ............ | A21B 3/04 |
| | | | | 126/20 |
| 5,368,008 A * | 11/1994 | Oslin | ................ | A21B 1/26 |
| | | | | 122/135.3 |
| 5,402,709 A * | 4/1995 | Carron | ................ | A47J 27/16 |
| | | | | 126/20 |
| 5,403,607 A * | 4/1995 | Erickson | ................ | A47J 37/015 |
| | | | | 426/466 |
| 5,415,081 A * | 5/1995 | Yoshida | ................ | A21B 7/005 |
| | | | | 366/146 |
| 5,460,158 A * | 10/1995 | Rigaud | ................ | F24C 15/327 |
| | | | | 126/20 |
| 5,491,323 A * | 2/1996 | Mori | ................ | H05B 6/645 |
| | | | | 219/494 |
| 5,505,975 A * | 4/1996 | Taylor | ................ | A23L 5/13 |
| | | | | 426/510 |
| 5,513,558 A * | 5/1996 | Erickson | ................ | A47J 37/015 |
| | | | | 126/21 A |
| 5,517,980 A * | 5/1996 | Cappello | ................ | A47J 27/16 |
| | | | | 126/20 |
| 5,532,456 A * | 7/1996 | Smith | ................ | A47J 27/16 |
| | | | | 110/179 |
| 5,558,797 A * | 9/1996 | Takagi | ................ | H05B 6/6411 |
| | | | | 219/705 |
| 5,595,109 A * | 1/1997 | Shelton | ................ | A47J 27/16 |
| | | | | 126/21 A |
| 5,598,770 A * | 2/1997 | Campbell | ............ | A23N 17/00 |
| | | | | 99/487 |
| 5,619,983 A * | 4/1997 | Smith | ................ | A47J 27/16 |
| | | | | 126/20 |
| 5,628,240 A * | 5/1997 | Yoshida | ................ | A21B 7/005 |
| | | | | 366/146 |
| 5,649,476 A * | 7/1997 | Montagnino | ............ | A47J 27/04 |
| | | | | 122/31.1 |
| 5,656,191 A * | 8/1997 | Lee | ................ | H05B 6/6458 |
| | | | | 219/707 |
| 5,676,044 A * | 10/1997 | Lara, Jr. | ................ | A21B 1/245 |
| | | | | 126/21 A |
| 5,689,060 A * | 11/1997 | Matsushima | ............ | A21B 3/04 |
| | | | | 219/707 |
| 5,699,722 A * | 12/1997 | Erickson | ............ | A47J 37/0623 |
| | | | | 126/21 A |
| 5,713,346 A * | 2/1998 | Kuechler | ................ | F24C 15/20 |
| | | | | 126/299 D |
| 5,723,846 A * | 3/1998 | Koether | ................ | F24C 7/087 |
| | | | | 219/483 |
| 5,771,879 A * | 6/1998 | Saltzman | ................ | F24C 15/20 |
| | | | | 126/299 D |
| 6,008,482 A * | 12/1999 | Takahashi | ............ | B24B 49/105 |
| | | | | 219/687 |
| 6,023,050 A * | 2/2000 | Violi | ................ | F24C 15/327 |
| | | | | 126/20 |
| 6,096,357 A * | 8/2000 | Helm | ................ | F24C 15/327 |
| | | | | 426/233 |
| 6,188,045 B1 * | 2/2001 | Hansen | ................ | F22B 27/16 |
| | | | | 126/20 |
| 6,274,859 B1 * | 8/2001 | Yoshino | ................ | H05B 6/6411 |
| | | | | 219/746 |
| 6,342,262 B1 * | 1/2002 | Wuest | ................ | A47J 27/16 |
| | | | | 126/20 |
| 6,742,515 B2 * | 6/2004 | Maier | ................ | F24C 15/2028 |
| | | | | 126/299 D |
| 6,943,322 B1 * | 9/2005 | Whipple, Jr. | ........ | F24C 15/2007 |
| | | | | 126/21 A |
| 6,987,246 B2 * | 1/2006 | Hansen | ................ | A21B 3/04 |
| | | | | 126/20 |
| 7,021,206 B2 * | 4/2006 | Eckenhausen | ........ | A47J 31/461 |
| | | | | 99/452 |
| 7,060,941 B1 * | 6/2006 | Embury | ................ | F24C 7/08 |
| | | | | 219/401 |
| 7,075,041 B2 * | 7/2006 | Kruempelmann | ........ | F24C 7/08 |
| | | | | 219/412 |
| 7,199,340 B2 * | 4/2007 | Yamasaki | ............ | H05B 6/6479 |
| | | | | 219/401 |
| 7,699,051 B2 * | 4/2010 | Gagas | ................ | F24C 15/2028 |
| | | | | 126/299 D |
| 7,875,833 B2 * | 1/2011 | Song | ................ | A23N 12/10 |
| | | | | 219/389 |
| 7,946,220 B2 * | 5/2011 | Ose | ................ | F24C 15/327 |
| | | | | 99/327 |
| 8,043,642 B2 * | 10/2011 | Schonemann | ............ | F24C 7/08 |
| | | | | 426/233 |
| 8,245,769 B2 * | 8/2012 | Godecker | ............ | F25B 21/02 |
| | | | | 165/253 |
| 8,777,119 B2 * | 7/2014 | Griffin | ................ | F23N 5/022 |
| | | | | 237/53 |
| 9,581,339 B2 * | 2/2017 | Yang | ................ | F22B 1/284 |
| 9,841,182 B2 * | 12/2017 | Shibuya | ................ | F22B 37/50 |
| 9,841,261 B2 * | 12/2017 | Raghavan | ............ | F24C 7/085 |
| 10,009,965 B2 * | 6/2018 | Kim | ................ | H05B 6/6435 |
| 10,548,340 B2 * | 2/2020 | Nelissen | ............ | H05B 6/6473 |
| 2001/0052852 A1* | 12/2001 | Kouznetsov | ............ | F24C 14/02 |
| | | | | 340/630 |
| 2002/0117162 A1* | 8/2002 | Bassoli | ................ | A47J 36/38 |
| | | | | 126/21 A |

(56) References Cited

U.S. PATENT DOCUMENTS

| | | | | |
|---|---|---|---|---|
| 2002/0178932 | A1* | 12/2002 | Cai | A47J 36/24 99/516 |
| 2002/0179588 | A1* | 12/2002 | Lubrina | F24C 15/327 219/400 |
| 2004/0026401 | A1* | 2/2004 | Jones | F24C 15/327 219/391 |
| 2004/0055477 | A1* | 3/2004 | Swank | A47J 37/042 99/419 |
| 2004/0079356 | A1* | 4/2004 | Fioriti | F24C 15/2021 126/299 R |
| 2004/0222208 | A1* | 11/2004 | Ko | A47J 27/04 219/401 |
| 2004/0256374 | A1* | 12/2004 | Riefenstein | F24C 15/327 219/400 |
| 2004/0261632 | A1* | 12/2004 | Hansen | A21B 3/04 99/468 |
| 2005/0006382 | A1* | 1/2005 | Hayakawa | F24C 15/327 219/682 |
| 2005/0051038 | A1* | 3/2005 | Bartelick | A23B 4/044 99/482 |
| 2005/0109215 | A1* | 5/2005 | Helm | F24C 15/327 99/330 |
| 2005/0139588 | A1* | 6/2005 | Kim | F24C 15/327 219/400 |
| 2006/0081592 | A1* | 4/2006 | Williams | F24C 7/087 219/401 |
| 2006/0088301 | A1* | 4/2006 | Kanzaki | H05B 6/6479 392/386 |
| 2006/0191892 | A1* | 8/2006 | Andoh | F24C 15/327 219/401 |
| 2006/0225726 | A1* | 10/2006 | Andoh | A21B 3/04 126/20 |
| 2007/0084454 | A1* | 4/2007 | Helm | F24C 15/327 126/20 |
| 2007/0138160 | A1* | 6/2007 | Ando | F24C 15/327 219/401 |
| 2007/0163567 | A1* | 7/2007 | Kaneko | F24C 15/327 126/21 A |
| 2007/0194003 | A1* | 8/2007 | Hansen | F24C 15/327 219/401 |
| 2007/0215608 | A1* | 9/2007 | Yoshino | H05B 6/74 219/681 |
| 2007/0227364 | A1* | 10/2007 | Andoh | A21B 3/04 99/324 |
| 2008/0020114 | A1* | 1/2008 | Umeda | A23L 3/24 426/511 |
| 2008/0066661 | A1* | 3/2008 | Berkenkoetter | F24C 15/2021 110/162 |
| 2008/0066732 | A1* | 3/2008 | Berkenkoetter | F24C 15/2007 126/21 A |
| 2008/0075823 | A1* | 3/2008 | Jeon | F24C 15/327 426/510 |
| 2008/0078371 | A1* | 4/2008 | Boscaino | F24C 14/005 126/20 |
| 2008/0105138 | A1* | 5/2008 | Segato | F24C 15/2007 99/447 |
| 2008/0134904 | A1* | 6/2008 | Heitmann | F24C 7/08 99/342 |
| 2008/0141996 | A1* | 6/2008 | Erdmann | F24C 15/2042 126/299 D |
| 2008/0149088 | A1* | 6/2008 | Inada | F24C 15/327 126/21 R |
| 2008/0223352 | A1* | 9/2008 | Ando | F24C 15/327 126/20 |
| 2008/0223353 | A1* | 9/2008 | Cristiani | F24C 15/327 126/20 |
| 2008/0229936 | A1* | 9/2008 | Kaneko | F22B 1/284 99/357 |
| 2008/0236404 | A1* | 10/2008 | Ose | F24C 7/08 99/327 |
| 2008/0264269 | A1* | 10/2008 | Sterzel | F24C 7/08 99/331 |
| 2009/0007798 | A1* | 1/2009 | Yamaguchi | F24C 15/327 99/330 |
| 2009/0107477 | A1* | 4/2009 | Frock | A21B 3/04 126/20.2 |
| 2009/0205625 | A1* | 8/2009 | Matsubayashi | F24C 15/327 126/21 A |
| 2009/0221933 | A1* | 9/2009 | Nishtala | A61B 5/205 600/561 |
| 2010/0051600 | A1* | 3/2010 | Maier | F24C 15/327 219/401 |
| 2010/0064902 | A1* | 3/2010 | Sakane | F24C 15/327 99/352 |
| 2010/0083845 | A1* | 4/2010 | Block | F22B 1/284 99/330 |
| 2010/0126356 | A1* | 5/2010 | Yamamoto | F24C 15/327 99/330 |
| 2010/0126358 | A1* | 5/2010 | Ueda | A21B 3/04 99/422 |
| 2010/0140251 | A1* | 6/2010 | Shei | A21B 3/00 219/430 |
| 2010/0154656 | A1* | 6/2010 | Yamamoto | F24C 15/327 99/467 |
| 2010/0224083 | A1* | 9/2010 | Yasuhara | F24C 15/327 99/476 |
| 2010/0224616 | A1* | 9/2010 | Yasuhara | F24C 15/327 219/401 |
| 2010/0301034 | A1* | 12/2010 | Greenwood | F24C 7/006 219/400 |
| 2010/0318230 | A1* | 12/2010 | Liu | G05D 21/02 700/282 |
| 2011/0132346 | A1* | 6/2011 | Sakane | F24C 15/327 126/15 R |
| 2011/0146503 | A1* | 6/2011 | Furukawa | F16J 15/324 99/447 |
| 2011/0147376 | A1* | 6/2011 | Ueda | F24C 15/327 219/682 |
| 2011/0209626 | A1* | 9/2011 | Underwood | H05B 6/642 99/357 |
| 2011/0259208 | A1* | 10/2011 | Ueda | H05B 6/6458 99/447 |
| 2012/0017770 | A1* | 1/2012 | Sakane | F24C 15/327 99/331 |
| 2012/0118169 | A1* | 5/2012 | Hirano | F24C 15/006 99/325 |
| 2012/0272947 | A1* | 11/2012 | Phillips | F24C 15/2007 126/21 R |
| 2013/0192473 | A1* | 8/2013 | Riefenstein | A47J 27/00 99/324 |
| 2013/0216673 | A1* | 8/2013 | Storek | A23L 5/13 426/509 |
| 2013/0259455 | A1* | 10/2013 | Schootstra | F22B 1/287 392/394 |
| 2013/0333684 | A1* | 12/2013 | Cescot | F24C 15/2007 126/21 A |
| 2014/0013963 | A1* | 1/2014 | Hoffmann | A47J 27/04 99/403 |
| 2014/0083309 | A1* | 3/2014 | Reese | B23P 19/04 99/474 |
| 2014/0083992 | A1* | 3/2014 | Linnewiel | F24C 7/043 219/400 |
| 2014/0116414 | A1* | 5/2014 | Sinur | F24C 15/2042 126/299 D |
| 2014/0290500 | A1* | 10/2014 | Wurdinger | F24C 14/005 99/403 |
| 2015/0000535 | A1* | 1/2015 | Yoshidome | F24C 15/327 99/331 |
| 2015/0004296 | A1* | 1/2015 | Deming | A21D 8/06 426/496 |
| 2015/0192305 | A1* | 7/2015 | Graw | F24C 15/2042 126/299 D |

(56) References Cited

U.S. PATENT DOCUMENTS

2015/0354827 A1* 12/2015 Faraldi .................... A21B 3/04
　　　　　　　　　　　　　　　　　　　　　　426/510
2016/0025351 A1*  1/2016 Koos .................. F24C 15/2007
　　　　　　　　　　　　　　　　　　　　　　426/231
2017/0321904 A1* 11/2017 Faraldi ............... F24C 15/2007

FOREIGN PATENT DOCUMENTS

| | | |
|---|---|---|
| DE | 202004015290 U1 | 2/2006 |
| DE | 102005059505 A1 | 6/2007 |
| DE | 202010008991 U1 | 2/2012 |
| EP | 0319673 A1 | 6/1989 |
| WO | 2014180760 A1 | 11/2014 |

* cited by examiner

HOUSEHOLD COOKING APPLIANCE

CROSS-REFERENCES TO RELATED APPLICATIONS

This application is the U.S. National Stage of International Application No. PCT/EP2017/069455, filed Aug. 1, 2017, which designated the United States and has been published as International Publication No. WO 2018/033384 A1 and which claims the priority of German Patent Application, Serial No. 10 2016 215 650.0, filed Aug. 19, 2016, pursuant to 35 U.S.C. 119(a)-(d).

BACKGROUND OF THE INVENTION

The invention relates to a household cooking appliance, having a cooking chamber, a steam generator, which is located outside the cooking chamber and is connected to the cooking chamber by way of a steam feed line, and a fresh air line, which leads to the cooking chamber and can be shut off by means of a shut off element. The invention is particularly advantageously applicable to ovens with a steam feed function.

WO 2014/180760 A1 discloses a steam cooking appliance. The steam cooking appliance has a cooking chamber with a cooking chamber throughput opening and a valve connected to the cooking chamber throughput opening, the valve being a three-way valve with three gates, the first of which is a gate, which is open for throughflow and connected to the cooking chamber throughput opening, the second of which is a variable throughflow gate open to the surroundings of the cooking chamber and the third of which is a variable throughflow gate connected to at least one shut off valve.

WO 2012/140003 A1 discloses a steam cooking appliance, in particular a steam oven, with a cooking chamber, which has at least one overflow opening in at least one of the side walls, connected to an overflow line, which branches into an overflow discharge and a steam release pipe, and at least one steam valve is provided at the steam release pipe, allowing the cross section through the steam release pipe to be changed at least temporarily.

In DE 102 45 773 C1 an apparatus for heat treating food is specified, with a housing, in which an appliance air supply opening and an appliance air discharge opening are provided, a heatable cooking chamber being provided within the housing, having a cooking chamber air supply opening and a cooking chamber air discharge opening, a valve being provided to control the supply of air to and discharge of air from the cooking chamber. In a bypass position the valve connects the cooking chamber air discharge opening to the cooking chamber air supply opening and the appliance air supply opening to the appliance air discharge opening. Therefore in the bypass position the cooking chamber atmosphere is simply circulated in circulation mode. The valve can also be set to through mode, in which air supplied from the appliance air supply opening is fed into the cooking chamber and discharged air exits by way of the cooking chamber air discharge opening to the appliance air discharge opening.

EP 0 319 673 A1 discloses that in a cooking appliance operated using steam toward the end of the cooking phase steam is discharged from the cooking chamber to the suction side of a fan by way of a controllable steam outlet opening and at the same time air is supplied to the cooking chamber from the compression channel of the fan by way of a controllable air supply opening. This allows the steam present in the cooking chamber to be reduced to such a degree that there is no longer a problematic egress of steam when the oven door is opened.

BRIEF SUMMARY OF THE INVENTION

The disadvantage of the above apparatuses of the prior art is that the fresh air supply is structurally relatively complex.

It is the object of the present invention to at least partially overcome the disadvantages of the prior art and in particular to provide an improved ability to reduce an absolute humidity and/or relative humidity, for example during a food treatment operation, in particular a steam treatment operation and/or thereafter.

This object is achieved according to the features of the independent claims. Preferred embodiments will emerge in particular from the dependent claims.

The object is achieved by a household cooking appliance, having a cooking chamber, a steam generator, which is located outside the cooking chamber and is connected to the cooking chamber by way of a steam feed line, and a fresh air line, which leads to the cooking chamber and can be shut off by means of a shut off element, the steam feed line and the fresh air line having a common end portion, which opens into the cooking chamber.

This household cooking appliance has the advantage that it allows a particularly compact structure to be achieved. The specific supply of fresh air means that the humidity in the cooking chamber can be regulated more readily. This is particularly advantageous with regard to improving treatment results for food in operating modes, in which a drying process features or a large amount of moisture is to be removed from the food. "Drying" mode for example can be improved significantly. It is also possible to reduce cooking chamber temperature in a specific and fast manner, which can improve food treatment and reduce treatment time. Better treatment results can thus be achieved with automatic programs in particular. Also the household cooking appliance can be used to achieve improved (more intensive and/or faster) drying of the cooking chamber per se, reducing corrosion of components exposed to the cooking chamber. It can also simplify the configuration of a vapor extractor, if present (e.g. an associated vapor valve).

The household cooking appliance can have an oven functionality or can be an oven. The cooking chamber can then be used as an oven chamber or can be an oven chamber. The cooking chamber can be heated for example by means of one or more electric heaters.

The steam generator or evaporator can be used to treat food present in the cooking chamber, without an additional heat supply and/or with an additional heat supply (steam cooking). The household cooking appliance therefore has a steam feed functionality and when additional heat is supplied a steam cooking functionality.

The household cooking appliance can also have a microwave functionality.

The household cooking appliance can have at least one temperature sensor for determining a cooking chamber temperature and/or at least one humidity sensor for determining moisture in the cooking chamber. The at least one sensor can be coupled to a control facility, which is also provided to control the steam generator, in particular to switch it on and off. Thus steam and/or fresh air can be supplied to the cooking chamber in a manner that is particularly precisely temperature-dependent and/or moisture-dependent, for example during the course of an automatic program.

The steam generator can be a boiler or a flow heater. The steam feed line can be connected on the one hand to a steam outlet opening of the steam generator and on the other hand (its end portion) can open into the cooking chamber.

The fresh air line opens into a spatial region outside the cooking chamber, for example into a spatial region within a housing of the household cooking appliance or into an aperture in the housing and on the one hand (with the end portion) in the cooking chamber.

The fact that the steam feed line and the fresh air line have a common end portion opening into the cooking chamber can be seen as meaning that fresh air can be introduced (in other words blown or sucked) at least progressively through the steam feed line into the cooking chamber or steam can be introduced (in other words blown or sucked) at least progressively through the fresh air line into the cooking chamber.

In one embodiment the cooking chamber has a vapor extractor, which is separated from the steam feed line and the fresh air line by the cooking chamber. It can be used to release vapor and/or fresh air from the cooking chamber. The vapor extractor can have a vapor blower.

In another embodiment the household cooking appliance does not have a fan for moving media in the fresh air line so the fresh air line is fanless. This allows a particularly economical and compact structure to be achieved. The fresh air can be sucked into the cooking chamber for example as a result of vapor (including steam) exiting from the cooking chamber, for example through an opened vapor extractor, optionally with the vapor blower running. This results in low pressure in the cooking chamber, which can be equalized by fresh air flowing through the fresh air line. This is particularly advantageous for a fully sealed cooking chamber (for example a full steam oven) with a fanless vapor extractor. However a reduction in moisture content is also significantly accelerated when a non-sealed appliance (for example an added steam oven) is used, in which fresh air can follow to a minor degree through leak points present (such as bushes, motor shaft passages, etc.).

In a further embodiment the household cooking appliance has a fan for moving media in the fresh air line. This can significantly improve the supply of fresh air. This in turn can accelerate for example a humidity reduction and/or temperature reduction in the cooking chamber. In one development a rotation speed of the fan can be varied to set a volumetric flow of the fresh air.

In a further embodiment the fan or blower can be rotated in a first rotation direction to draw (in other words blow or suck) the medium present in the fresh air line into the cooking chamber and can be rotated in a second rotation direction to remove (in other words conversely to suck or blow) medium present in the cooking chamber through the fresh air line. This allows a specific supply of fresh air into the cooking chamber and removal of vapor (including steam) or hot air from the cooking chamber to be achieved through the same line in a particularly simple and economical manner. There is then no need for a separate vapor extractor for example.

In a further embodiment the fan is a circulating fan present in the cooking chamber. This has the advantage that there is then no need to provide a separate fan or blower to move medium in the fresh air line. The circulating fan can be used to circulate air in the cooking chamber. The circulating fan can be part of a circulating heater, in particular together with a ring-type heater that encloses the circulating fan radially.

In a further embodiment a rotation speed of the fan can be varied to control and/or regulate a volumetric flow of gaseous medium moved through the fresh air line. This allows even finer adjustment of a food treatment operation.

The circulating fan or circulating heater can be arranged behind a baffle, in particular between the baffle and a rear face of a cooking chamber wall or muffle.

In yet another embodiment the end portion (when viewed from the front into the cooking chamber) opens into the cooking chamber behind the circulating fan. The suction effect or compression effect on the opening of the end portion into the cooking chamber is particularly marked there, so the medium present in the fresh air line can be moved particularly effectively by rotating the circulating fan.

In a further embodiment the fan is a fan or blower (cooling fan) located outside the cooking chamber. This has the advantage that it allows particularly effective movement of the medium present in the fresh air line. Also such a cooling fan can be adjusted in a particularly versatile manner for the movement of the medium in the fresh air line.

The cooling fan can be a fan that is provided specifically, in particular exclusively, to move the medium present in the fresh air line.

Alternatively the cooling fan can be a fan that is already present to cool other components of the household cooking appliance, for example a fan for cooling electronic components and/or for cooling a cooking chamber door. This has the advantage that there is no need to provide a separate fan or blower to move medium in the fresh air line.

In another embodiment the shut off element is a fresh air shut off element, in other words it is not designed or arranged to shut the steam generator off from the cooking chamber. The end portion can then be located between the fresh air shut off element and the cooking chamber. The fresh air shut off element is therefore not an element of the steam supply but just of the fresh air line. This allows a particularly economical structure to be achieved.

In one development the steam feed line is permanently open in relation to the cooking chamber; in other words it cannot be closed by means of a (further) shut off element (steam shut off element). This allows a particularly economical structure to be achieved.

In another development the steam feed line can be closed by means of a steam shut off element, in particular in such a manner that the end portion is located between said steam shut off element and the cooking chamber. The steam shut off element can only shut off the gas connection between the steam generator and the cooking chamber, not the gas connection between the fresh air line and the cooking chamber. This allows fresh air and/or steam to be supplied to the cooking chamber in a particularly flexible manner.

In another embodiment the steam generator can be connected for gas purposes to the fresh air line. This allows fresh air also to be blown into the steam generator, particularly when the steam generator is switched off or deactivated. This has the advantage that the steam generator and the steam feed line can be dried by the fresh air, which increases service life and reduces or even completely prevents "old" water remaining behind. This can be achieved particularly effectively if the medium in the fresh air line, including the common end portion, can be moved by means of a fan. Particularly effective drying results, if standing water can be removed from the steam generator, for example by way of a controllable process.

In a further embodiment either the steam feed line or the fresh air line (apart from the common end portion) can optionally be shut off by means of the shut off element. This is a particularly simple way of allowing the cooking chamber to be supplied with fresh air or steam alternately or as required.

In a further embodiment the shut off element is an electrically switchable shut off element, for example a solenoid valve. It can be switched for example by means of a control facility. This allows control of a particularly diverse and freely selectable introduction of fresh air into the cooking chamber. Alternatively or additionally the introduction of gaseous medium (e.g. fresh air) into the cooking chamber or out of the cooking chamber (e.g. its volumetric flow) can be regulated, for example if a humidity sensor is present in the cooking chamber.

In an alternative development the shut off element is a physically switching shut off element, for example a shut off element that switches as a function of temperature or a shut off element that switches as a function of moisture. The physically switching shut off element can have an expanding element or can be an expanding shut off element. The expanding shut off element can have a wax actuator, an oil actuator, or the like.

In a further embodiment the end portion is configured as a support of a T-piece. This allows branching of the common end portion on the one hand to an aperture (fresh air feed aperture) of the fresh air line facing away from the opening of the cooking chamber and on the other hand to the steam generator in a particularly simple manner.

In a further embodiment the household cooking appliance is designed to introduce fresh air into the cooking chamber automatically after a cooking operation. This allows door opening to be more user-friendly, as vapor and/or steam has been at least partially pushed out of the cooking chamber beforehand by the fresh air. This embodiment is particularly advantageous if steam has been introduced previously into the cooking chamber. If the food treatment has been performed as part of an automatic program, in one development a signal to terminate the program is only output to a user after fresh air has been introduced into the cooking chamber. The period during which fresh air is fed in can be time-controlled (e.g. by way of a timer), determined as a function of temperature (e.g. when a temperature threshold is reached) and/or determined as a function of moisture (e.g. when a moisture threshold is reached).

The fact that the household cooking appliance is designed to perform a specific function means that it is specifically able to carry out said function. This can be achieved by a hardware-based embodiment (e.g. the presence of a corresponding control facility, sensor system, etc.) and/or by a software-based embodiment (e.g. corresponding programming, for example of a control facility, etc.).

BRIEF DESCRIPTION OF THE DRAWINGS

The properties, features and advantages of the present invention and the manner in which these are achieved will become clearer and more readily comprehensible in conjunction with the following schematic description of an exemplary embodiment, which is explained in more detail below in conjunction with the drawings.

DETAILED DESCRIPTION OF EXEMPLARY EMBODIMENTS OF THE PRESENT INVENTION

Figure 1:
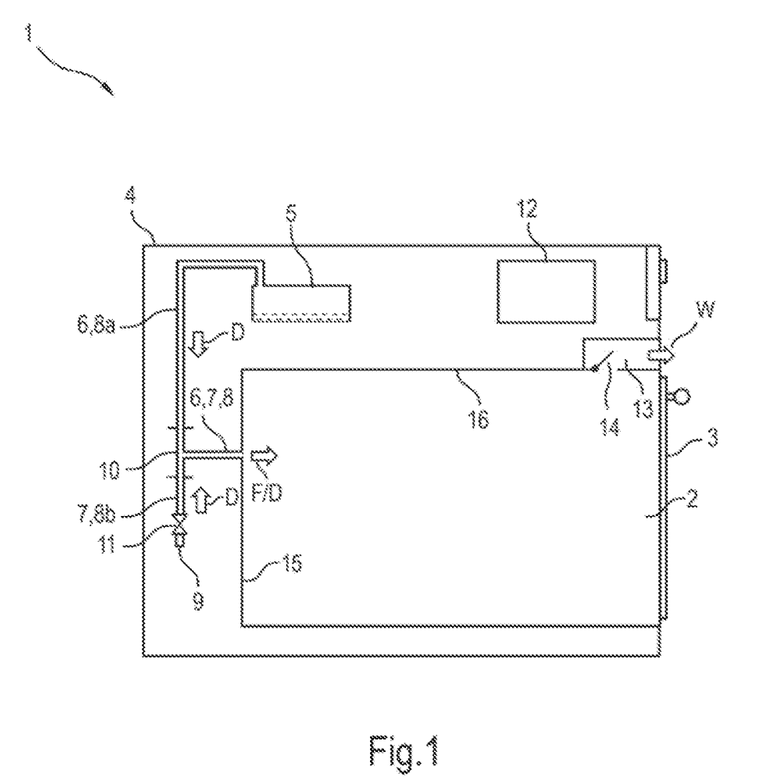
FIG. 1 shows a cross section through a side view of an outline of a household cooking appliance according to a first exemplary embodiment.

FIG. 1 shows a cross section through a side view of an outline of a household cooking appliance 1 according to a first exemplary embodiment. The household cooking appliance 1 is an oven with a steam feed function and to this end it has a cooking chamber 2, which is open at the front and the loading opening of which can be closed by means of a door 3. Outside the cooking chamber 2 but within a housing 4 is a steam generator 5, in this instance in the form of a boiler. An upper steam outlet aperture of the steam generator 5 is connected to the cooking chamber 2 by way of a steam feed line 6. The household cooking appliance 1 also has a fresh air line 7 leading to the cooking chamber 2 or opening into the cooking chamber 2. The steam feed line 6 and the fresh air line 7 have a common portion (end portion) 8, which opens into the cooking chamber. Therefore the end portion 8 first runs outside the cooking chamber 2 from the cooking chamber 2. A first branch 8a branches from it to the steam generator and a second branch 8b branches from it to an aperture (fresh air feed aperture 9) of the fresh air line 7. The steam feed line 6 therefore consists of the first branch 8a and the end portion 8, while the fresh air line 7 consists of the second branch 8b and the end portion 8.

The end portion 8, a portion of the first branch 8a adjoining the end portion 8 and a portion of the second branch 8b adjoining the end portion 8 are configured here as respective connectors or supports of a T-piece 10.

The fresh air line 7 is provided with a fresh air shut off element in the form of a shut off valve 11 behind the end portion 8 (in other words between the end portion 8 and the second branch 8b or in the second branch 8b). The shut off valve 11 allows a connection between the fresh air feed aperture 9 and the cooking chamber 2 to be interrupted but not between the steam generator 5 and the cooking chamber 2. This is the same as saying that the fresh air line 7 can be shut off by means of the shut off valve 11 but the steam feed line 6 is always open in the direction of the cooking chamber 2. Alternatively it could also be possible to shut the steam feed line 6 off individually. In another alternative it could optionally be possible to shut the fresh air line 7 and the steam feed line 6 off for example alternately.

The shut off valve 11 can be a shut off valve that can be switched electrically by means of a control facility 12. The control facility 12 can be a central control facility of the household cooking appliance 1 and can be designed for example to perform automatic programs or operating settings input directly by a user. To this end the control facility 12 can heat the cooking chamber 2 for example by activating electric heaters (e.g. a ring-type heater of a circulating heater, at least one top heater or grill heater, a bottom heater, etc.), activate the steam generator 5, etc. The control facility 12 can be coupled to one or more sensors (not shown), for example to a temperature sensor to detect a cooking chamber temperature, a moisture sensor, etc.

The fresh air line 7 is fanless, in other words there is no fan or blower, which is able to move gaseous medium present in the fresh air line 7 to a significant degree. Instead fresh air F can pass through the fresh air feed aperture 9 into the cooking chamber 2 by way of the fresh air line 7 by opening a vapor extractor 13, which can draw vapor from the cooking chamber 2. The exiting vapor W generates a low pressure in the cooking chamber 2, which causes the fresh air F to be sucked into the cooking chamber 2. The fresh air F following through the fresh air line 7 therefore equalizes the pressure in the cooking chamber 2. Opening and closing of the vapor extractor 13 can be brought about by opening or closing a vapor valve 14. A vapor fan (not shown) may be present.

The end portion 8 can open in particular into a rear wall 15 of the cooking chamber wall or muffle, while the vapor extractor 13 preferably opens into the top 16 of the cooking chamber wall.

During operation of the household cooking appliance 1 for example in a heating segment of a food treatment process the vapor valve 14 can be closed, while the cooking chamber 2 is heated. The steam generator 5 can then be activated to generate steam D. The steam pressure causes the steam D to flow through the steam feed line 6 into the cooking chamber 2. The shut off valve 11 is closed to prevent steam D and/or vapor W exiting.

In order to be able to remove the steam D specifically and quickly from the cooking chamber 2 again during or after the food treatment, the vapor valve 14 and shut off valve 11 can be opened. This removes hot vapor W (including steam D) from the cooking chamber 2 and feeds in cooler fresh air F. This feeding in of fresh air F can also take place in a separate segment after a food treatment segment. Such a fresh air segment can be performed for a predefined time for example. The feeding in of fresh air F through the fresh air line 7 can generally be used to improve regulation of moisture in the cooking chamber, to improve regulation of a temperature in the cooking chamber, to remove steam D from the cooking chamber, to cool the cooking chamber (with or without steam D) more quickly, etc.

Figure 2:
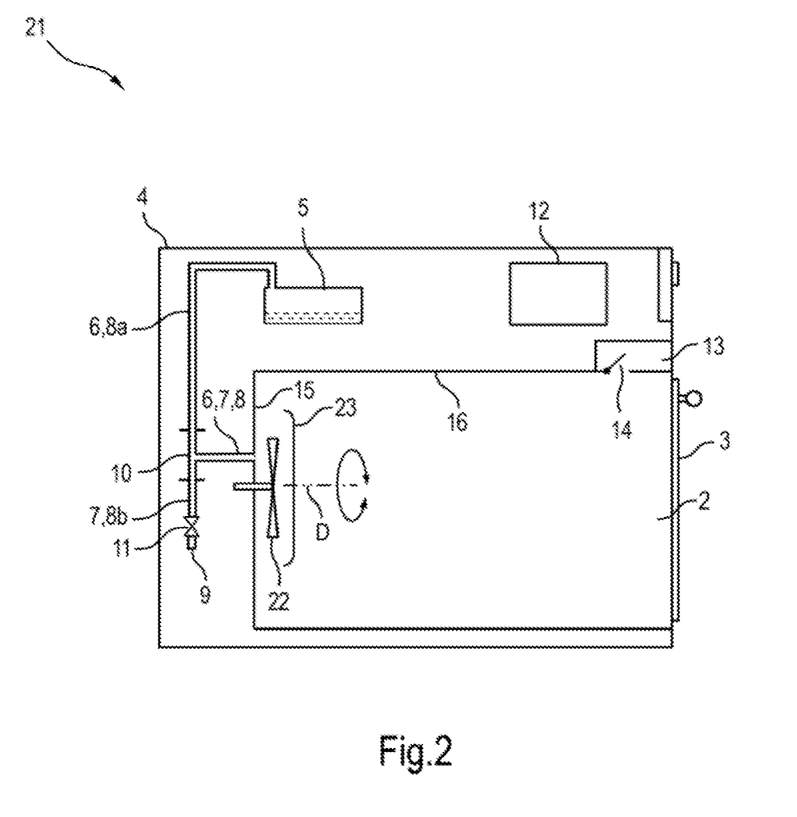
FIG. 2 shows a cross section through a side view of an outline of a household cooking appliance according to a second exemplary embodiment.

FIG. 2 shows a cross section through a side view of an outline of a household cooking appliance 21 according to a second exemplary embodiment. The household cooking appliance 21 differs from the household cooking appliance 1 in that it has a circulating fan 22 present in the cooking chamber 2. The circulating fan 22 can be used to circulate air in the cooking chamber, in particular in conjunction with a ring-type heater (not shown) enclosing the circulating fan 22 and to provide a hot air functionality. The circulating fan 22 and the ring-type heater—if present—are concealed by a baffle 23 at the front.

The end portion 8 opens into the cooking chamber 2 behind the circulating fan 22, so that when the circulating fan 22 is rotated about a rotation axis D, an additional suction effect is generated at the opening of the end portion 8, which can increase a flow volume through the end portion 8—and therefore also through the fresh air line 7.

In one variant the circulating fan 22 has a variable rotation direction (as shown by the curved double arrow). This allows suction or compression to be generated at the opening of the end portion 8 by setting the rotation direction. The circulating fan 22 can thus be rotated in a first rotation direction to suck the gaseous medium present in the end portion 8—in particular therefore also in the fresh air line 7—into the cooking chamber 2. It can be rotated in a second, counter rotation direction to push gaseous medium present in the cooking chamber 2 into the end portion 8—in particular also into the fresh air line 7. This allows gaseous medium (hot air, steam D, vapor W, etc.) to be released through the fresh air line 7. This in turn reinforces the effect of the vapor extractor 13 or even allows the vapor extractor 13 to be dispensed with completely, in particular if the fresh air feed aperture 9 then serving as the media outlet aperture corresponds to an opening in the housing 4 and the medium is therefore not ejected into the household cooking appliance 1.

Figure 3:
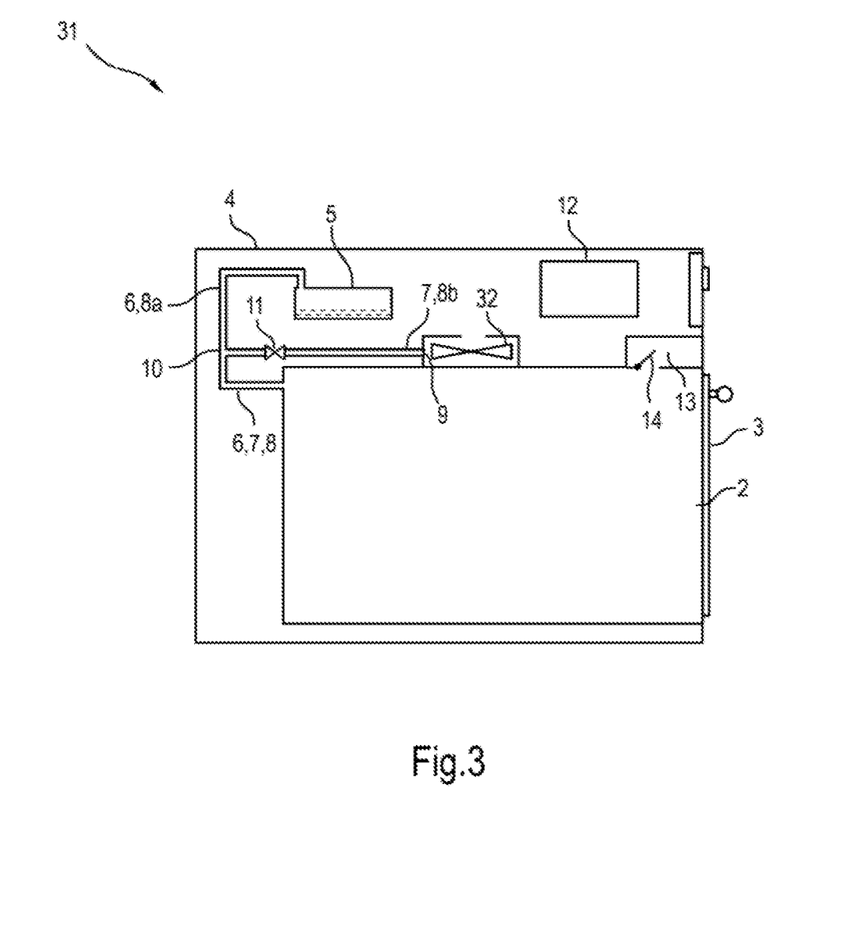
FIG. 3 shows a cross section through a side view of an outline of a household cooking appliance according to a third exemplary embodiment.

FIG. 3 shows a cross section through a side view of an outline of a household cooking appliance 31 according to a third exemplary embodiment. The household cooking appliance 31 differs from the household cooking appliance 1 in that it has a cooling fan 32 located outside the cooking chamber 2. The cooling fan 32 can be provided for example to cool an electronic unit (e.g. the control facility 12) and can run continuously for example during operation of the household cooking appliance 31. The cooling fan 32—e.g. a radial blower—is connected to the fresh air feed aperture 9 in such a manner that it pushes fresh air F into the fresh air feed aperture 9. This results in a particularly high volumetric flow of fresh air F in the fresh air line 7.

In one variant the household cooking appliance 31 can have a circulating fan 22.

The steam generator 5 can be connected to the fresh air line 7 for gas purposes in all household cooking appliances 1, 21 and 31. Fresh air F can thus be introduced into the first branch 8a of the steam feed line 6 and optionally also into the steam generator 5, when the steam generator 5 is not operating or is deactivated. This allows the first branch 8a and the steam generator 5 to be dried, thereby extending their service life.

The present invention is of course not restricted to the illustrated exemplary embodiment.

Generally "one" can refer to one or a number, in particular in the sense of "at least one" or "one or more", unless this is specifically excluded, for example by the expression "just one" etc.

A number can comprise precisely the specified number as well as a standard tolerance range, unless this is specifically excluded.

The invention claimed is:

1. A household cooking appliance, comprising:
   a cooking chamber;
   an end portion connected to the cooking chamber;
   a T-piece connected to the end portion;
   a steam generator for supplying steam, the steam generator located outside the cooking chamber;
   a steam feed line connecting the steam generator to the T-piece, the T-piece connecting the steam generator to the end portion and allowing steam to enter the cooking chamber via the end portion;
   a fresh air line for supplying fresh air, the fresh air line connecting to the T-piece, the T-piece connecting the fresh air line to the end portion and allowing fresh air to enter the cooking chamber via the end portion; and
   a shut off element configured to shut off the fresh air line, wherein the end portion is common to both the steam feed line and the fresh air line.

2. The household cooking appliance of claim 1, wherein the fresh air line is fanless.

3. The household cooking appliance of claim 1, further comprising a fan for moving a gaseous medium in the fresh air line, said fan being rotatable in a first rotation direction to introduce the gaseous medium in the fresh air line into the cooking chamber and rotatable in a second rotation direction to remove gaseous medium in the cooking chamber through the fresh air line.

4. The household cooking appliance of claim 3, wherein the fan is a circulating fan accommodated in the cooking chamber.

5. The household cooking appliance of claim 3, wherein the end portion opens into the cooking chamber at a location behind the circulating fan.

6. The household cooking appliance of claim 3, wherein the fan is a cooling fan located outside the cooking chamber.

7. The household cooking appliance of claim 1, wherein the shut off element is a fresh air shut off element, said end portion being located between the fresh air shut off element and the cooking chamber.

8. The household cooking appliance of claim 1, wherein the shut off element is disposed in the T-piece and is configured to selectively shut off the steam feed line or the fresh air line.

9. The household cooking appliance of claim 1, wherein the shut off element is an electrically switchable shut off element, and further comprising a control facility configured to switch the shut off element.

10. The household cooking appliance of claim 1, wherein the cooking chamber includes a vapor extractor which is separated from the steam feed line and the fresh air line by the cooking chamber.

11. The household cooking appliance of claim 1, wherein after a cooking operation fresh air is automatically introduced into the cooking chamber.

12. The household cooking appliance of claim 1, wherein the T-piece allows for a gaseous medium to flow from the fresh air line into the steam generator via the steam feed line.

13. The household cooking appliance of claim 1, further comprising a circulating fan capable of rotating at a variable rotation speed to control and/or regulate a volumetric flow of a gaseous medium through the fresh air line.

* * * * *